No. 894,912. PATENTED AUG. 4, 1908.
F. P. SMITH.
CREMATORY.
APPLICATION FILED NOV. 23, 1904.
3 SHEETS—SHEET 1.
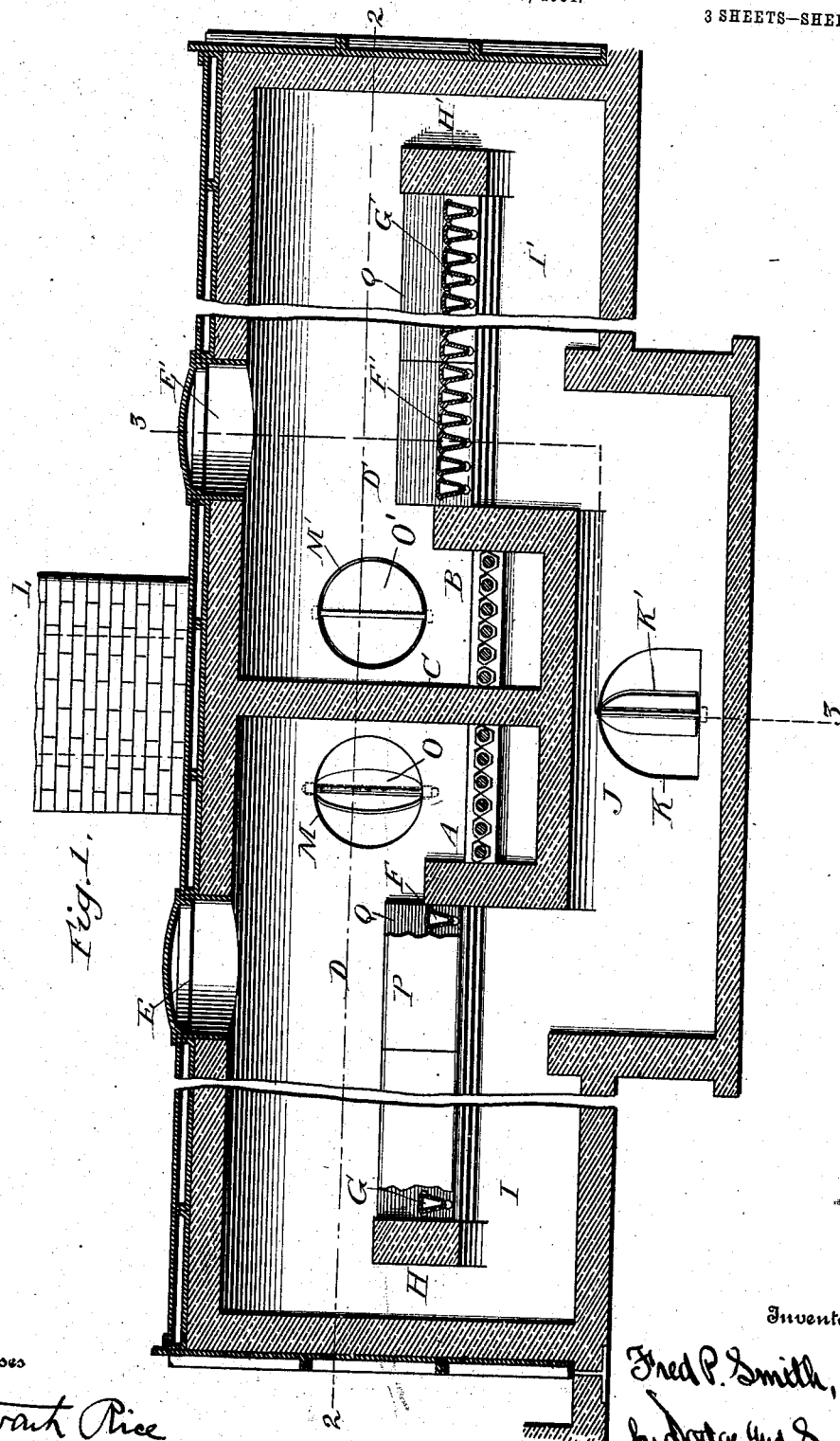

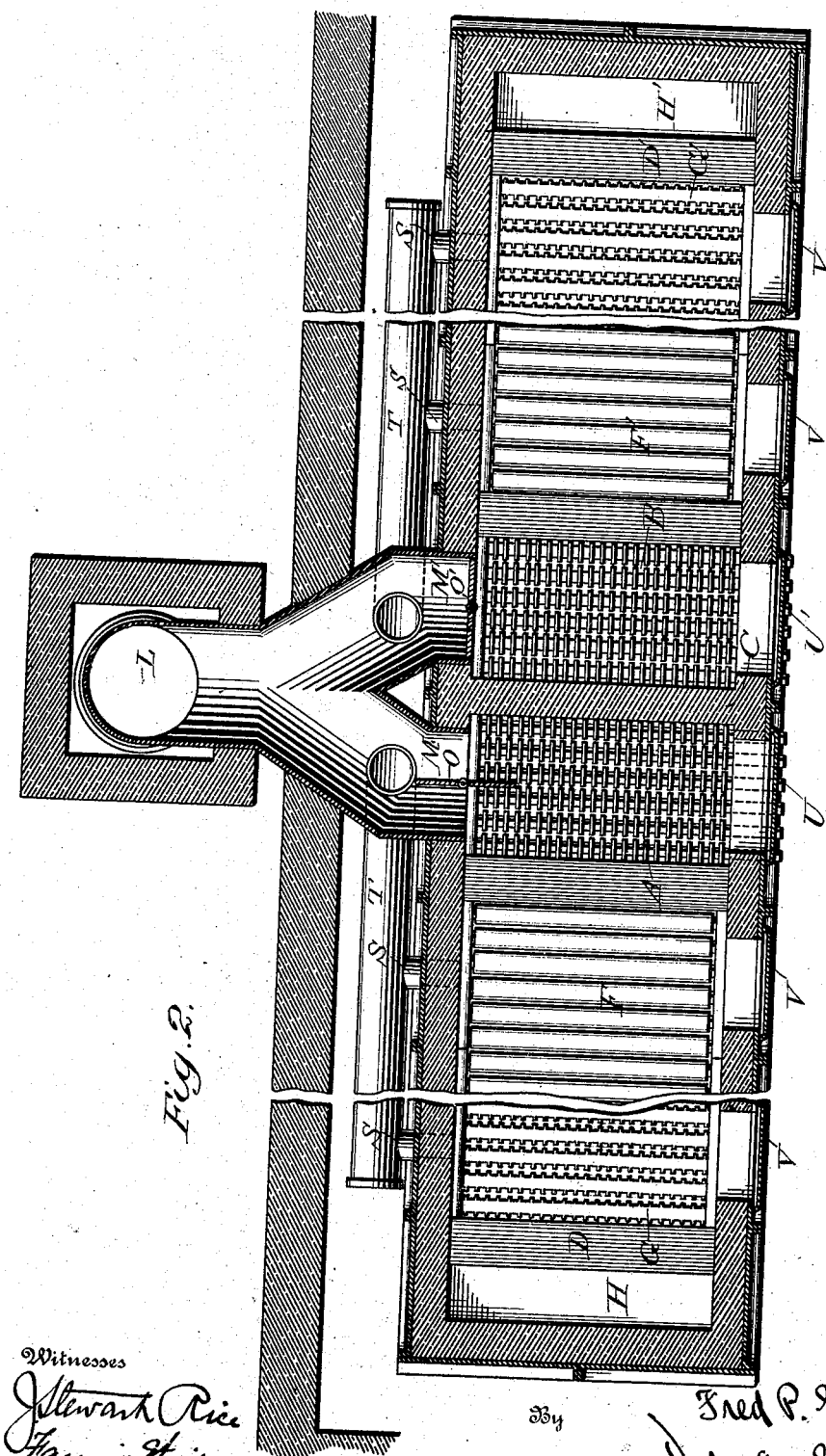

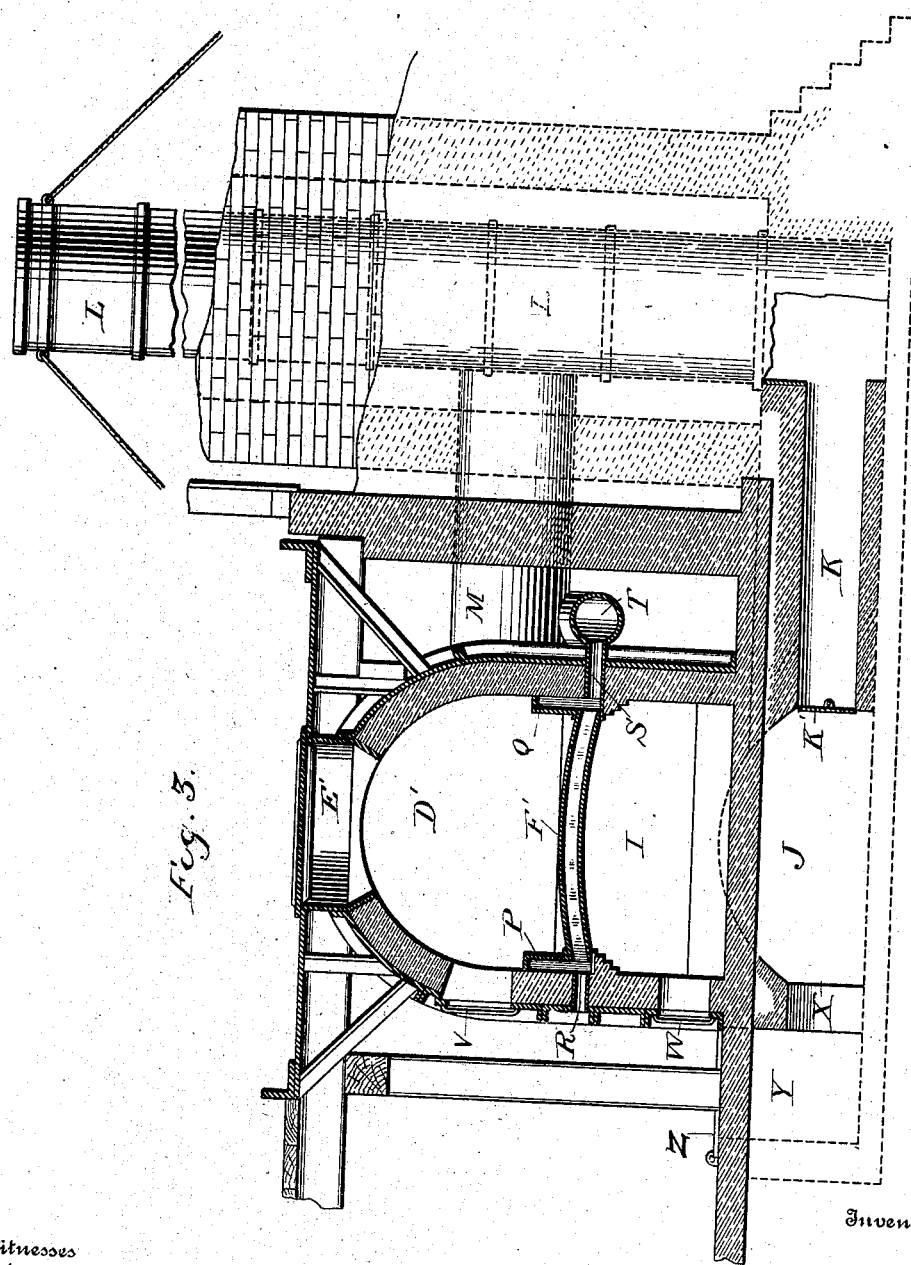

UNITED STATES PATENT OFFICE.

FRED P. SMITH, OF KANSAS CITY, KANSAS, ASSIGNOR OF ONE-HALF TO EDWARD C. LEWIS, OF CHICAGO, ILLINOIS, AND JOHN H. KITCHEN, OF KANSAS CITY, MISSOURI, COPARTNERS, DOING BUSINESS AS LEWIS & KITCHEN, OF KANSAS CITY, MISSOURI, A FIRM.

CREMATORY.

No. 894,912.  Specification of Letters Patent.  Patented Aug. 4, 1908.

Application filed November 23, 1904. Serial No. 234,081.

*To all whom it may concern:*

Be it known that I, FRED P. SMITH, a citizen of the United States, residing at Kansas City, in the county of Wyandotte and State of Kansas, have invented certain new and useful Improvements in Crematories, of which the following is a specification.

My present invention pertains to improvements in crematories, the construction and advantages of which will be hereinafter set forth, reference being had to the annexed drawings, wherein:

Figure 1 is a longitudinal vertical sectional view of the apparatus; Fig. 2 a horizontal sectional view taken on the line 2—2 of Fig. 1; and Fig. 3 a transverse sectional view taken on the line 3—3 of Fig. 1.

The object of the invention is to provide a crematory in which garbage and the like may be continuously treated, the burning charge, previously dried, serving to dry out the new charge introduced, the charge thus dried being subsequently burned and effecting a drying of the charge introduced in the other portion of the apparatus.

A further object of the invention is to provide the crematory with flues or passages connected with the chimney or stack in such manner as to preclude the escape of noxious vapors or gases.

A still further object is to provide a grate of peculiar form for supporting the garbage or the like, the construction precluding the establishment of a short-circuit draft within the garbage-receiving chamber, thereby insuring the passage of the products of combustion from the previously-dried burning charge over and under the entire charge within that chamber in which the garbage is being dried.

Another object is to so construct the apparatus that one section may be operated independently of the other if it be necessary to close down one section for any reason.

It is also an object of the invention to provide means for keeping the garbage-sustaining grates from burning.

Referring to the drawings, A and B denote the initial or primary furnaces, located upon opposite sides of a central division wall C, which separates the crematory into two drying and combustion chambers D, D'. The upper walls of the chambers are preferably arched and a series of man-holes E E' placed therein permit the garbage and other substances to be cremated to be dumped upon the grates immediately below. The grate of each combustion and drying chamber is composed of two sets or series of hollow bars, the first series, F, F' or those next adjacent to the primary furnace, having the form best shown in Fig. 2, that is, the edges of the bars are straight and make a close fit. The second series, G, G' or those remote from the furnaces, are preferably provided or formed with teeth upon the edges. By thus constructing the grate the products of combustion from the furnace are caused to traverse substantially the whole length of the grate or throughout the length of the combustion chamber, passing through a flue or way H or H', as the case may be, to the space or chamber I or I' beneath the grate. A chamber J connects said chambers I and I', and the three may be treated as one. A flue or passage K connects chamber J with the stack or chimney L, while flues M, M' connect the combustion chambers D, D', respectively, at a point adjacent to the furnaces A and B with said stack or chimney, as best shown in Fig. 2. Suitable dampers O, O' are placed in said flues M, M', and control the passage of the products of combustion therethrough to the main stack L. A damper K' likewise controls the passage K.

As will be seen by reference to Fig. 3, the hollow grate-bars open at their ends into hollow chambers P and Q, the former being in direct communication with the outside atmosphere through pipes R. The inner chamber Q is connected with a series of pipes S, which in turn open into a trunk T, the trunks (there being one for each combustion chamber grate as shown in Fig. 2) discharging into the flues M, M'. It will thus be seen that so long as there is the slightest draft in the chimney a current of air will be induced through the various grate-bars. Inasmuch as the trunks open into the flues M, M' at a point outside of the dampers O, O', the current drawn through the bars is unaffected by the change in the direction of passage of the products of combustion through the crematory.

Doors U, U' afford access to the furnaces A and B, while doors V and W open, respectively, into the combustion chambers and the return flues or passages I, I'.

The operation of the apparatus is as follows: Assuming that a charge of green or undried garbage is dumped onto the grates of one of the combustion chambers, for instance, the grates F', G', a fire will be started in furnace B, damper O' being opened until a sufficient draft is established in the stack. When this is obtained the damper is closed and the products of combustion are thereby caused to pass over the charge on the grate, through flue H', chamber I', chamber J, through flue K and into the stack. This is continued until the charge is dried to such an extent that it will burn. A charge is then placed in the combustion and drying chamber D, valve or damper K' being closed and damper O opened. The products of combustion passing from the burning dried charge in chamber D' and also from the furnace B, if the fire therein be still burning, will then pass beneath the grate of combustion chamber D, through flue H, over the new or green charge, and thence through flue M to the stack. It will thus be seen that the products of combustion of one charge serve to dry and to prepare the subsequent charge for burning. The hot products of combustion tend to destroy the noxious odors arising from the fresh charge and if desired a fire may be maintained in the furnace A (or B, according as the charge is being burned in one or the other combustion chamber) in order to entirely destroy any fumes or odors which might otherwise pass to the stack or chimney. It will thus be seen that after the apparatus is once started, damper K', which controls the down draft to the base of the stack, may be kept closed. On the other hand, the damper may be opened when it becomes necessary to discontinue the use of one section for any reason; or it may be left open when both charges are being burned, or both being dried by the action of the products passing from the furnaces A and B. It is thus manifest that the apparatus while simple in construction, may be readily manipulated to suit varying conditions.

By connecting the chambers or return flues I, I' by an off-set passage, as is best illustrated in Fig. 1, much dust will be arrested. This may be withdrawn from the apparatus through a port X, Fig. 3, which opens into a pit Y, which however is kept closed under normal working conditions by a door Z.

Having thus described my invention, what I claim is:

1. In a crematory, the combination of a chimney or stack; two combustion chambers located adjacent to each other and communicating with the stack at their proximate ends through separate and independently-controllable openings; and a flue or chamber extending beneath the combustion chambers and connecting the remote ends thereof.

2. In a crematory, the combination of a stack or chimney; a pair of proximate but separated furnaces; a flue extending from each furnace directly to the stack; a pair of combustion and drying chambers, one in communication with each of said furnaces; and a return flue or chamber extending beneath said combustion chambers and connecting the remote ends thereof.

3. In a crematory, the combination of a stack or chimney; a pair of proximate but separate furnaces; a flue extending from each of said furnaces to the stack; a pair of combustion and drying chambers, one in communication with each of said furnaces; a return flue or chamber extending beneath said combustion chambers and connecting the remote ends thereof; and a flue leading directly from said return flue to the stack.

4. In a crematory, the combination of a stack or chimney; two combustion chambers located adjacent to each other and communicating at their proximate ends with the stack through separate and independently-controllable openings; and a flue or chamber, extending beneath the combustion chambers, and connecting the remote ends thereof, said flue being provided with an offset in its length thereby forming a dust-arresting chamber, substantially as described.

5. In a crematory, the combination of a stack or chimney; two combustion chambers located adjacent to each other and communicating at their proximate ends with the stack; a flue or chamber, extending beneath the combustion chambers and connecting the remote ends thereof, said flue being provided with an offset in its length thereby forming a dust-arresting chamber; and a flue extending from said dust-arresting chamber to the stack.

6. In a crematory, the combination of a stack or chimney; a pair of proximate, separate furnaces, said furnaces being in communication with said stack; a pair of combustion and drying chambers, one in communication with each of said furnaces; a grate for each of said chambers, that portion of the grate which lies immediately adjacent to the furnace being relatively tight or close, and a return flue or chamber connecting the outer ends of said combustion chambers.

7. In a crematory, the combination of a combustion chamber; a stack or chimney in communication therewith; a grate for the combustion chamber comprising hollow chambers located upon opposite sides of the combustion chamber, one of said chambers being in direct communication with the atmosphere, and a series of hollow grate-bars opening into said hollow chambers; a series of pipes extending from the hollow chambers opposite that into which the air enters; and connections intermediate said pipes and the stack.

8. In a crematory, the combination of a pair of furnaces A and B, located upon opposite sides of a division-wall C; a stack or chimney; flues extending from said furnaces to the stack; means for closing said flues at will; a pair of combustion chambers, said chambers extending respectively in opposite directions from said furnaces; a chamber extending beneath the combustion chambers and the furnaces and connecting the opposite ends of the combustion chambers; a flue extending from said connecting chamber to the stack; and means for keeping the grates of the combustion chambers cool, substantially as described.

9. In a crematory, the combination of a stack or chimney; two combustion chambers located adjacent to each other and communicating with the stack at their proximate ends; a flue or chamber extending beneath the combustion chambers and connecting the remote ends thereof; and a grate located in each combustion chamber, that portion of each grate which lies adjacent to the proximate ends of the chambers being relatively tight or close, whereby short-circuit drafts are prevented.

In testimony whereof I have signed my name to this specification in the presence of two subscribing witnesses.

FRED P. SMITH.

Witnesses:
 HORACE A. DODGE,
 FANNIE WISE.